Oct. 27, 1959    M. O. LUNDGAARD    2,910,023
SEED PLANTER CHECK CORRECTING MECHANISM
Filed Jan. 31, 1957
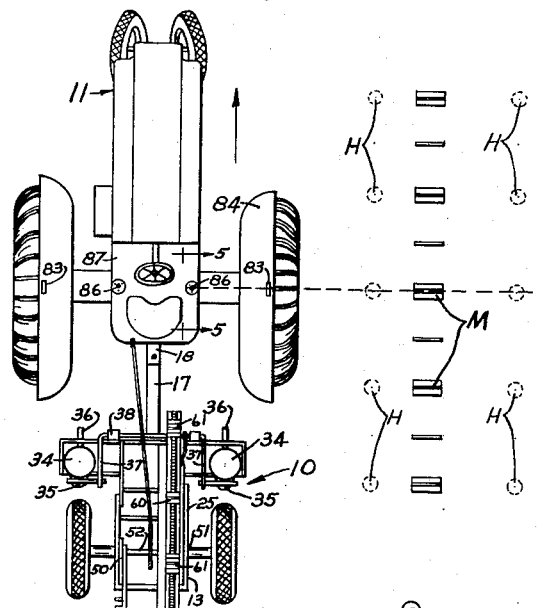
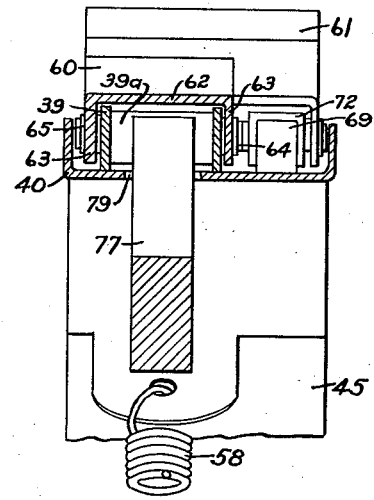
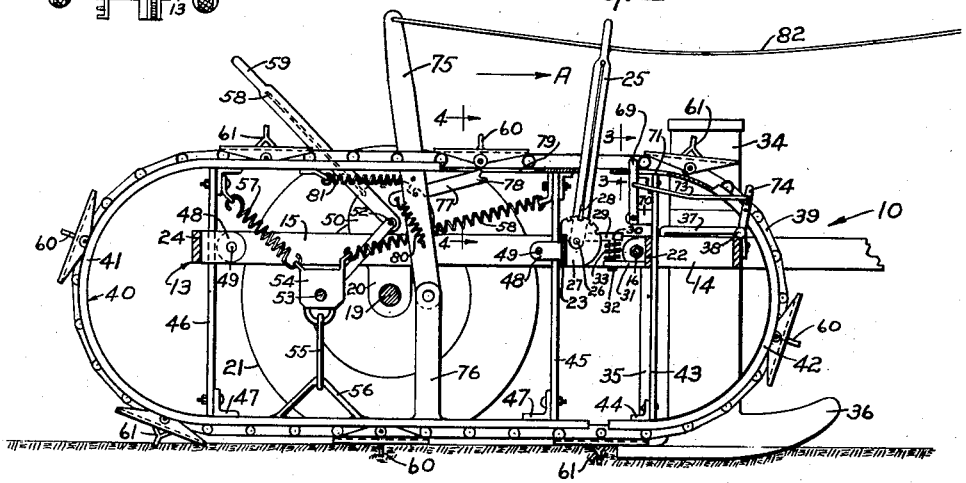
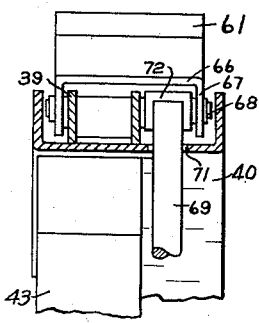
INVENTOR.
MELVIN O. LUNDGAARD
BY
Williamson, Schroeder,
Adams + Meyers
ATTORNEYS

United States Patent Office 2,910,023
Patented Oct. 27, 1959

2,910,023
SEED PLANTER CHECK CORRECTING MECHANISM

Melvin O. Lundgaard, Beldenville, Wis.

Application January 31, 1957, Serial No. 637,471

1 Claim. (Cl. 111—16)

This invention relates to seed planting and more specifically relates to apparatus for planting seeds at regularly spaced and predetermined intervals.

In planting such crops as corn and the like, it is desirable that the seeds be planted in rows extending both lengthwise and crosswise of the field. Previously known devices for accomplishing planting in this manner have been exceedingly cumbersome to use, and have been particularly difficult to get started properly at the beginning of each row.

An object of my invention is the provision of a new and improved seed planting mechanism of simple and inexpensive construction and operation for placing the seeds at regularly spaced predetermined intervals along the ground whereby to produce crop rows extending both lengthwise and crosswise of the field.

Another object of my invention is the provision in a seed planting mechanism of novel apparatus facilitating starting of a crop row in relation to other adjacent rows in such manner that crop rows are formed both lengthwise and crosswise of the field.

A further object of my invention is the provision of novel and improved apparatus for use in planting corn and the like and which is adapted to facilitate aligning the corn hills both lengthwise and crosswise of the field without requiring the operator to get off his tractor.

Fig. 1 is a top plan view of the invention shown attached to a tractor and adjacent a planted crop row;

Fig. 2 is a longitudinal section view taken substantially along a vertical plane through the attachment;

Fig. 3 is a detail transverse section view taken substantially at 3—3 in Fig. 2;

Fig. 4 is a detail section view taken substantially at 4—4 in Fig. 2 and

Fig. 5 is a detail elevation view taken on a plane indicated substantially at 5—5 in Fig. 1.

The invention is shown in one form in the drawings and is described herein and comprises an attachment indicated in general by numeral 10 for a tractor indicated in general by numeral 11.

The attachment 10 has a frame 13 which has a front section 14 and a rear section 15 which are swingably interconnected by pivot bolts 16 at the opposite sides thereof and oriented to facilitate swinging of the frame sections relative to each other about a horizontal axis extending transversely of the attachment 10. The forward section 14 of the frame has an elongated attachment tongue 17 affixed thereto and adapted for attachment to the draw bar 18 of the tractor. The rear portion 15 of the frame has an axle 19 journalled in suitable bearings 20 thereon, and is supported by a pair of mobile ground-engaging support members or wheels 21 disposed transversely outwardly from the frame.

The front and rear sections 14 and 15 of the frame have a number of cross members 22, 23 and 24 rigidly affixed to the longitudinal frame members.

Means are provided for raising and lowering the front section 14 of the frame and in the form shown, such means include a handle 25 swingably mounted by a bolt 26 on a notched plate 27 which is rigidly affixed to the forward cross member 23 of the rear section 15 of the frame. Handle 25 has a conventional locking dog receivable into the several notches of plate 27 for securing the handle in the desired position. An arm 29 is rigidly affixed to the lower end of handle 25 and extends transversely outwardly therefrom. A rod 30 is swingably connected to the outer end of arm 29 and extends downwardly through an apertured ear 31 which is affixed to the cross member 22 of the forward frame section 13. Rod 30 is secured in ear 31 by a nut 32, and a spring 33 is mounted on rod 30 and bears against the ear 31 and against the arm 29. By releasing the dog 28 and swinging the arm 25 in a clockwise direction as viewed in Fig. 2, the forward section 14 is urged downwardly causing swinging of the forward frame section 14 about bolt 16 and about the connection to the tractor draw bar. The rear end portion 15 of frame 13 likewise swings slightly to an oblique position. When handle 25 is swung in a counter-clockwise direction, the forward frame section 14 is elevated.

A seed-dispensing mechanism is provided on the frame 13 and includes seed receptacles 34 on the forward section of the frame and also includes valve apparatus in the housings 35 immediately rearwardly of the ground-engaging shoes 36. The valve apparatus includes an operating member 37 swingably mounted in bearings 38 on the cross frame 21.

Means are provided for periodically operating the operating member 37 so as to deposit seeds on the ground at predetermined intervals and in transverse alignment with seed hills in adjacent crop rows. In the form shown such means include a ground-engaging timing element having a substantially continuous ground-engaging periphery. In the form shown, the timing element comprises an endless roller chain 39 slidably mounted in a channel which is indicated in general by numeral 40. Channel 40 includes a generally U-shaped rear section 41 mounted on the rear section 15 of frame 13 and for vertical adjustment, and also includes a substantially U-shaped forward channel section 42 which is affixed to the forward frame section 14 for vertical movement therewith by an upright brace 43 which is affixed as by welding to cross member 22 and is affixed to the channel section 42 as by angle clips 44.

The rear section 41 of channel 40 has a pair of upright braces 45 and 46 affixed thereto as by clip angles 47, and each of the upright braces 45 and 46 is disposed between a pair of transversely spaced guiding ears 48 in vertically slidable relation thereto and is retained between the ears by a bolt 49 extending between the ears. The attachment is provided with means for raising the rear section 41 of channel 40 and chain 39 off the ground. In the form shown, such means include a pair of bearings 50 and 51 on opposite sides of frame section 15 and a rotary shaft 52 extending therebetween and having a crank 53 formed integrally thereof. A bearing block 54 is rotatably mounted on the crank 53 and is connected by means of link 55 to a V-shaped rod 56 which is affixed to the lower portion of channel section 41. Block 54 is also connected to a pair of forwardly and rearwardly upwardly inclined tension springs 57 and 58, the outer ends of which are connected to the upper ends of upright braces 45 and 46. The bearing plate 50 has a notched periphery for receiving a suitable locking dog on handle 59 which is affixed to the shaft 52. By swinging handle 59 in a clockwise direction, the crank 53 is likewise swung clockwise causing the link 55 to raise the channel section 41 relative to the frame 13. As the channel section 41 moves upwardly the upright braces 45 and 46 slide between the ears 48 and of course the chain 39 is raised off the ground. As the handle 59 is swung in a counter-clockwise direction, crank 53 and bearing block 54 move downwardly, causing the springs 57 and 58 to bear downwardly on the channel section 41 and pull the channel and pin downwardly to the ground. The springs 57 and 58 continuously urge the chain into the ground as the tractor and attachment progressively move along the ground surface.

The chain 39 has a plurality of ground-engaging lugs secured thereto in spaced relation around the periphery thereof. Certain of the lugs on the chain 39 are traction lugs 60 which are relatively small in size and effectively operate to engage the ground surface and move the chain around the track. Other of the lugs on chain 39 comprise ground-marking elements 61 which are substantially larger than the traction lugs 60 and produce a readily visually perceptible mark M in the ground surface.

As best seen in Fig. 4, the traction lugs 60 project outwardly from a plate 62 which has downwardly extending and apertured ears 63 which are disposed in close proximity with and on opposite sides of the chain 39 and are mounted on a suitable connecting pin 64 of the chain. The pin 64 may be retained in the chain and through the ears 63 by any suitable means such as E-rings 65.

As best seen in Fig. 3, the ground-marking lugs 61 extend substantially completely across the channel 40 and are mounted on a flat plate 66 which has depending apertured ears 67 which receive an elongated connecting pin 68 of the chain therethrough. As is distinctly seen in Fig. 4, the marking lugs 61 are very substantially larger than the traction lugs 60.

Means are provided for operating the valve operating member 37 periodically as the chain progressively moves around the track 40. In the form shown, such means include an upright lever 69 swingably mounted on an ear 70 which is affixed to brace 43. The lever 69 extends upwardly through an elongated slot 71 in the forward section 42 of the channel. A plurality of camming elements 72, which in the form shown comprise rollers, are mounted on the pins 68 and between the depending mounting ears 67 of marking lugs 61 and the chain 39. The upright lever 69 is connected by means of a swingable link 73 to an upright arm 74 which is affixed to the valve operating member 37. Each of the camming elements 72 is mounted on the chain 39 at a respective marking lug 61, and in the form shown, it is noted there are four equally spaced marking lugs on chain 39. The marking lugs 61 and the operating lever 69 are arranged in relation to the chain 39 and the seed planting valve mechanism so that each time a marking lug moves along the seed-dispensing mechanism at ground level, the valve mechanism is operated by another of the camming elements on the chain 39. A mark is thereby produced in the ground surface in transverse alignment with the seeds planted which, in the case of corn planting, are disposed in hills H.

Means are provided for producing progressive movement of the chain 39 around the track 40 to facilitate initial aligning of the marking elements 61 with marks M in the ground surface adjacent the seeds planted in previous crop rows. In the form shown, such means comprise an oscillatable driving member 75 which is swingably mounted on an upright post or stand 76 which is affixed to the rear channel section 41. A ratcheting pawl 77 has a recessed forward end portion 78 which extends upwardly through an elongated slot 79 in the top portions of the rear channel portion 41 and is adapted to engage the chain rollers 30a and progressively move the chain around the track in the direction of arrow A. A spring 80 between the rear end of pawl 77 and the drive member 75 is arranged to urge the forward end portion 78 of the pawl into engagement with the chain. Another spring 81 is connected with the drive member 75 and with the channel 41 for swinging the drive member rearwardly. A cord or suitable connecting means 82 is connected to the drive member 75 and may be connected adjacent the seat of the tractor to facilitate operating the drive member from the tractor seat.

Sighting means are provided on the tractor 11 for use with the attachment 10 for positioning the seed-dispensing mechanism in transverse alignment with hills of seeds in adjacent crop rows. This is particularly important when a new row is started. Such sighting means include, in the form shown, an elongated upright frame element 83 on the fender 84 of the tractor and defining an elongated upright slit 85. An upright rod 86 defines a rear sight and is spaced inwardly from the slot 85 and secured on a suitable portion of the tractor body such as the bar 87.

In operation, the attachment 10 is drawn across a field by the tractor and the timing element or chain 39 engages the ground and is progressively moved around the track 40 by the several lugs 60 and 61 which project into the soil. The camming elements 72 successively engage the lever 69 to operate the seed-dispensing mechanism causing seeds to be dropped in hills in transverse alignment with the marks M formed in the ground surface by the marking lugs 61. As the chain moves around the track, the ratchet pawl 77 rides over the chain and does not materially effect the operation thereof.

When the end of the row is reached, the handle 25 is operated to raise the forward section 14 and then cause the shoe 36 and channel section 42 to be raised above the ground and to likewise cause the forward portion of the chain 39 to be raised off the ground. The handle 59 is operated to raise the rear end portion 41 of track 40 off the ground. The tractor and attachment are then turned around to prepare for planting new rows of corn. The tractor is driven along the new direction of travel until the sights 86 and 85 are aligned with one of the marks M in the adjacent row. The seed-dispensing mechanism is thereupon in transverse alignment with a hill H of corn seed in the previous row. While the chain 39 and the lugs thereon are elevated off the ground surface, the driving member 75 is oscillated causing the pawl 77 to engage and progressively move the chain 39 around the track in the direction of arrow A. The chain 39 is moved until one of the camming elements 72 engages lever 69. It will be noted here that means may be provided in connection with the camming element and lever 69 to operate an electric signal light on the tractor when the chain 39 is in proper position so that the camming element 72 bears against the lever 69. Ordinarily it is easy to manually feel through the cord 82 when the camming element 72 engages the lever 69. The cord 82 is then released and the drive member 75 returns to the normal position shown in Fig. 2. The handle 59 is then swung in a counter-clockwise direction to lower the rear portion 41 of the track, and the handle 25 is then swung clockwise to lower the forward end of the track. The tractor will then be driven forwardly and seeds are deposited onto the ground in transverse alignment with each of the hills H in the adjacent crop row.

It will be noted that the chain 39 and the lugs 60 and 61 engage the ground over a substantial length of service area. As a result small depressions or rises in the ground surface will not effect the spacing of the seeds because at least certain portions of the chain will be in engagement with the ground at all times.

It will be seen that I have provided a new and improved planting mechanism which is constructed to readily and easily align the seeds being planted with similar seeds in an adjacent crop row so as to produce rows both lengthwise and crosswise of the field.

It will further be noted that I have provided in a planting mechanism, apparatus for starting a crop row in such a manner that each of the seeds therein will be in transverse alignment with seeds in an adjacent row.

It will, of course, be understood that various changes may be made in the form, detail, arrangement and proportion of the parts without departing from the scope of my invention which consists of the matter described herein and set forth in the appended claim.

What I claim is:

A planting mechanism attachable to a tractor, comprising a supporting frame securable to the tractor, a movable timing element on the frame and having a substantially continuous ground-engaging periphery movable in an orbital path, upwardly and downwardly movable mechanism mounting the timing element on the frame, said timing element also having a camming element movable therewith in an orbital path, means connected with the supporting frame for raising the movable mechanism and lifting said timing element off the ground, seed-dispensing mechanism on the frame and including valve means having an operating element disposed in the orbital path of said camming element and arranged to be periodically operated thereby, an oscillatable driving element mounted on the movable mechanism for upward and downward movement with the timing element, a spring pressed pawl on the driving element and in ratcheting and continuously engaging relation with the timing element for moving the timing element in one direction when the driving element is oscillated, and control means connected with said driving element and constructed for operating the same at a position remote from the driving element, whereby the timing element may be positioned at the starting of a crop row to cause dispensing of a seed in transverse alignment with other seeds in adjacent rows.

References Cited in the file of this patent

UNITED STATES PATENTS

| | | |
|---|---|---|
| 843,162 | Morse | Feb. 5, 1907 |
| 1,126,393 | Chrisco | Jan. 26, 1915 |
| 1,161,298 | Felsman | Nov. 23, 1915 |
| 1,193,281 | McClain | Aug. 1, 1916 |
| 1,229,941 | Goodin | June 12, 1917 |
| 2,138,011 | Myers | Nov. 29, 1938 |
| 2,548,226 | Maier | Apr. 10, 1951 |
| 2,559,761 | Fulton | July 10, 1951 |